Oct. 25, 1960  D. A. CUSANO ET AL  2,958,002
PRODUCTION OF COLORED IMAGES
Filed Oct. 29, 1954
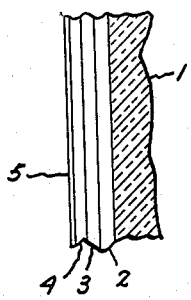
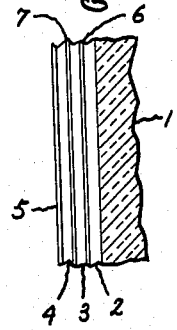
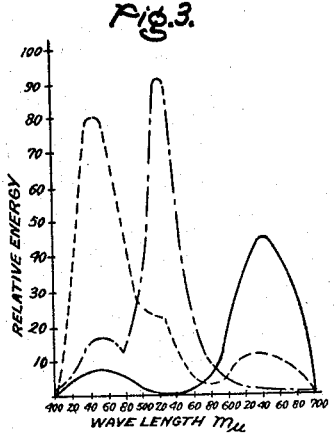
Inventors:
Dominic A Cusano,
Frank J. Studer,
by Paul A. Frank
Their Attorney.

United States Patent Office 2,958,002
Patented Oct. 25, 1960

2,958,002

PRODUCTION OF COLORED IMAGES

Dominic A. Cusano and Frank J. Studer, Schenectady, N.Y., assignors to General Electric Company, a corporation of New York Filed Oct. 29, 1954, Ser. No. 465,532

8 Claims. (Cl. 315—21)

This invention relates to the production of colored images as in color television, color radar and the like. More particularly, it relates to a cathode ray tube for producing color effects and to the colored light producing screen employed therein. This application is a continuation in part of my earlier filed application, Serial No. 320,266, now abandoned, filed November 13, 1952.

In United States Patent 2,590,018, to Koller and Williams, a cathode ray tube screen for producing colored images had a plurality of mono-particle thick layers of phosphors capable of producing different colors under cathode ray excitation. The construction of Koller and Williams required relatively thick phosphor layers which necessitated the use of an electron beam having an intensity of the order of 25 to 40 kilovolts. The high potential necessary to the operation of the device of Koller and Williams presented certain undesirable problems.

Accordingly, an object of the present invention is to produce an improved color image producing screen.

Another object of the invention is to provide a color image producing screen in which the colored image is produced by excitation at comparatively low potentials.

Another object is to provide a colored image producing screen in which the colored image is characterized by increased contrast and definition.

Another object of the invention is to provide a colored image producing screen having a plurality of continuous and uniform films of phosphor.

Another object is to provide colored image producing screen having a minimum number of necessary components.

Fig. 1 shows a cross section of a portion of a colored image producing screen produced in accordance with the present invention.

Fig. 2 is an alternative embodiment of the device of Fig. 1.

Fig. 3 is a spectrogram plot of a screen of three different electron beam potentials illustrating the purity of colors obtainable using the present invention.

Fig. 4 shows a typical circuit in connection with which the present screen may be employed.

Briefly stated, in accordance with one of its aspects, a cathode ray tube screen for producing colored images comprises a plurality of uniform, transparent, continuous films of phosphors capable of producing different colors of high purity under cathode ray excitation.

In our copending applications, Serial No. 200,908, filed December 15, 1950 (now Patent 2,675,331); Serial No. 243,272, filed August 23, 1951 (now Patent 2,659,-678); and Serial No. 280,292, filed April 3, 1952 (now Patent No. 2,789,062), all of which are assigned to the same assignee as the present invention, we disclose various methods of preparing transparent luminescent films. In application Serial No. 200,908 we describe the preparation of transparent luminescent films of zinc or cadmium sulfide or selenide produced by evaporating an activator and a zinc or cadmium salt, or mixture thereof, reacting the vapor with hydrogen sulfide or hydrogen selenide, and depositing the sulfide or selenide thus produced on a heated base.

In our application Serial No. 243,272, we describe a transparent phosphor film consisting of zinc or cadmium sulfide or selenide having an underlying transparent film of manganese sulfide to improve the homogeneity of the film. The film of manganese sulfide is produced by condensing vaporized manganese metal upon a work piece and then contacting the manganese with hydrogen sulfide while maintaining the manganese at a temperature of about 400–600° C.

Our application Serial No. 280,292 discloses a transparent phosphorescent film of manganese activated zinc-magnesium fluoride or magnesium fluoride produced by coating a work piece with a thin film of magnesium fluoride, heating the film to a temperature above 400° C., and contacting the film (1) with hydrogen fluoride and manganese halide vapor; (2) with zinc, hydrogen fluoride, and manganese halide; (3) with ammonium chloride and manganese halide; or (4) ammonium chloride, zinc, and manganese halide.

By the methods of preparation disclosed in our above three applications, it is possible to produce uniform transparent phosphor films having a thickness of as little as 0.2 micron. The transparent phosphor films are preferably positioned one on top of another. The layers may also be separated by an inert electron absorbing layer but such layers are not necessary.

The principle upon which this invention is based is that the penetration of electrons emitted from any source, such as an electron gun in a cathode ray tube, depends upon their velocity which varies as a square root of their potential. With a given material to be penetrated, the higher the impinging velocity or potential, the greater is the electron penetration. It is also known that an electron beam gives up most of its energy at a particular depth in the material. If, then, three layers or films of phosphors, each of which produces a different colored light upon excitation, are superimposed one upon the other to form a composite screen, a potential voltage may be supplied to electrons impinging on the screen to cause them to penetrate to any desired depth and then give up most of their energy. Depending upon the initial velocity or potential, this may be made to occur in the first, or succeeding layer and the light produced is mainly the color of the light produced by the phosphor layer in which most of the energy of the electron beam is lost with some color from other layers in which energy is absorbed. Thus, if all the energy from an electron beam is absorbed in a first, red light producing layer, the color emitted is red. If the beam is adjusted to penetrate to and lose most of its energy in a second blue light producing phosphor layer, the color is mainly blue with some red, depending on how much of the energy is absorbed in the first, red layer. Similarly, if the electron beam is adjusted to lose most of its energy in a third, green light producing phosphor layer, the resultant color is mainly green. The amount of red and blue color depends again on the energy absorbed in the first and second layers.

The cathode ray tube in which color differentiation is achieved by varying the electron beam potential as described above may be referred to as a "penetron." It is obvious that in order to obtain similar brightness response to the electron beam throughout the expanse of any one phosphor layer of a penetron, the layers should be of uniform thickness. At the same time, it should be continuous and thin enough to enable selective excitation by electron beams of low intensity.

Prior art phosphor screens of the "penetron" type are not satisfactory in this respect. Ideally, since the "penetron" type tube operates on the principle of different energy electrons causing different color excitation, such screens should be so constructed that an electron of a given energy penetrates to a given predictable depth into the screen, irrespective of the point of incidence. Such is not the case, however, with prior art penetron-type screens. Conventional screens comprising a plurality of layers, each of which is a particulate layer composed of many grains of phosphor, include vacant interstices, and are highly inhomogeneous. An electron impinging upon such a screen travels through both phosphor particles and vacant interstices, and the distance it travels before causing luminescence varies with the particular path taken. Additionally, particulate phosphor screens are highly non-uniform in thickness. Thus, in such screens there is no assurance that electrons of given energies always penetrate to the same depth, and hence, cause the same color excitation. The result is a very low value of color purity.

In the past, the above disadvantages of particulate phosphor penetron screens have been sought to be overcome by the addition of added layers of energy absorbing material intermediate the several layers of the penetron screen. This expedient, while improving color purity somewhat, is only partially effective and at best required additional costly steps to be included in "penetron" screen manufacture.

Improved penetron screens have also been provided in the form of a plurality of monomolecular phosphor layers. This construction, while reducing lack of uniformity over the screen face, does not solve the problem of non-uniform penetration of electrons of the same energy which strike different portions of the screen. This is due to the irregular nature of the monomolecular layers which do not present a uniformly thick layer of phosphor particles. For the above reason, the improved monomolecular "penetron" screen still require energy absorbing layers intermediate the several phosphor layers in order that satisfactory color purity be obtained.

According to this invention "penetron" type color luminescent screens are provided in the form of uniform, continuous transparent films which are of equal thickness throughout, and which include no irregularities or interstices. An electron striking the screens of the invention penetrates to a given, predictable depth, which is dependent upon the electron energy, irrespective of the point of incidence. According to the invention then, "penetron" type color screens may be constructed without the use of energy absorbing layers intermediate the several phosphor layers. Such screens are simpler to manufacture, and have inherently higher color purity than any "penetron" type color luminescent screen heretofore available.

Additionally, since the screens of this invention are continuous and homogeneous, and possess no intemediate crystal interfaces, no light is lost by reflection, and losses through halation and scattering are eliminated.

The use of uniform, thin transparent phosphor films also permits the excitation of a film at substantially lower electron beam potentials than in the case of gross particulate layers or the mono-particle layers of the Koller and Williams patent. In order to provide satisfactory color definition and intensity, we prefer to have films from 0.2 to 0.5 micron in thickness. While all three color emitting films may have the same thickness it is not necessary that this be the case. In many of the practical applications of our invention the layer first encountering the electron beam may have a thickness of the order of 0.2 micron, while the next layer may have a thickness of the order of 0.4 micron. The thickness of the third layer is not of great importance since its transparency enables a very thick layer to be used without interfering with the transmission.

Representative examples of transparent film phosphors which may be used in connection with the present invention are zinc-cadmium sulfide (high cadmium content) for emitting red light, zinc sulfide for emitting blue light, and zinc-cadmium sulfide (low cadmium content) for emitting green light. While we are listing only a single phosphor for each color, it is obvious that any phosphor emitting in the desired color which may be produced in the form of a transparent film of controllable thickness is satisfactory for use in accordance with our invention.

A screen made up in accordance with our invention in which all three of the color emitting films are 0.2 micron in thickness may be operated at a maximum potential of about 15 kilovolts. In this case, the red phosphor may be energized by a beam of 5 kilovolts, the blue by a beam of 9 kilovolts, and the green by a beam of 15 kilovolts. Obviously, many circuit simplifications are possible where only 15 kilovolts, instead of 25 or more, are needed in the operation of the apparatus.

A cross sectional view of a composite screen made up of several transparent films is shown in Fig. 1. The composite phosphor screen is laid on a glass base 1 which may be flat or have any desired radius of curvature. Preferably, the red, blue and green light producing phosphors are laid in inverse order on the glass base, that is, the green layer 2 is laid adjacent the base, the blue film 3 next, and the red film 4 next. The phosphor layers 3 and 4 may be as thin as 0.2 micron, but are preferably of the order of 0.3 micron. The phosphor layer 2 may be considerably thicker in order to enable it to absorb all the electron energy entering it after passage through the films 4 and 3. Preferably, though not necessarily, a film 5 of conducting material is placed over the outermost layer 4 of phosphor. The film 5 may be composed of aluminum or any of the transparent conducting surfaces such as tin oxide or titanium oxide. The film 5 serves to drain off any electrostatic charge which may tend to accumulate on the phosphor screen. It also serves to reflect light which otherwise would be diverted to the interior of the cathode ray tube of which the screen is a part.

It will be appreciated that the present screen permits the production of a plurality of colors for electron beam potentials under 15 kilovolts, whereas gross layer screens applied by settling techniques will produce at such voltages only the color of the first layer impinged upon, and mono-particle layers require about 25 kilovolts to achieve the same effect.

In Fig. 2 of the drawing, there is shown an alternative embodiment of the invention. In Fig. 2, glass base 1, phosphor films 2, 3, and 4, and conducting layer 5 are the same as in the embodiment of Fig. 1. However, in the embodiment of Fig. 2, transparent layers of non-luminescent materials 6 and 7 are interposed between the individual phosphor layers 2, 3 and 4. Transparent layers 6 and 7, although not necessary to obtain high purity colored images from the screen, may be used to separate the individual phosphor layers 2, 3 and 4 from one another in certain methods of production to insure chemical isolation between layers 2, 3 and 4.

Layers 6 and 7 are not to be confused with the energy absorbing layers of prior art "penetron" type screens which must be of uniform thickness, energy absorbing, and are necessary to the production of high purity colored images. Films 6 and 7 are, on the other hand, not critical as to thickness and need only be substantially transparent to cathode rays. These films, when utilized, are only for convenience in manufacturing processes and are not necessary for the production of high purity color pictures.

The extreme sharpness of the color change obtainable using the present uniform films is in contrast to that produced by gross particulate superimposed layers of phosphor material and represents a considerable improvement over mono-particle layers. The results shown in Fig. 3 are typical, however, not only for mono-particle layers, but also for the thin films of this invention.

In order that the means of applying the teaching of the present invention may be more readily understood, reference is made to Fig. 4 which shows schematically a color television receiving unit. It will be understood, of course, that this particular arrangement is shown not in a limiting sense, but merely for the purposes of illustration. It will also be understood that the present screen may be used wherever it is desired to convert electrical pulses into color; typical examples being radar and television.

In Fig. 4, a cathode ray tube 11 has an evacuated envelope 12 containing an electron gun 13, a deflecting system 14, a semiconductive coating 15, and a screen 16. Electrons emitted by cathode 17 are controlled and focused by control grid 18, attracted by first anode 19 and further accelerated toward the screen 16 by the semiconducting coating 15 which acts as a second anode. The electron beam is aimed at the desired point of the screen 16 by means of the deflecting system 14 which comprises horizontal deflecting coil 20 and a vertical deflecting coil 21.

Considering the operation of the illustrative system as a whole, the incoming signal is intercepted by an antenna 22 and is converted to an intermediate frequency by means of a high frequency oscillator in a receiver 23. The signal is usually further amplified in an intermediate frequency amplifier, not shown, to a level suitable for detection. After detection, the signal is amplified in a video amplifier 24 to a proper level and applied to the control grid 18 of a cathode ray tube 11. This video signal is also applied to the synchronizing signal separator 25 where timing pulses are derived to synchronize the horizontal and vertical sweep generators 26 and 27. These generators supply sawtooth waves of current to the deflection coils 20 and 21. The video signal is also applied to a color synchronizer 28 which supplies timing pulses to a high voltage switching unit 29 which in turn furnishes color signals to a post deflection electrode 30 at the screen 16 to produce the proper sequence of colors.

The use of a post deflection acceleration cathode ray tube, as in the present example, is preferred because the focus and deflection of the electron beam need not be changed to correspond to each value of the high voltage applied to the screen. Of course, with the addition of proper equipment, the present system may be applied to any type of cathode ray tube as is well known to those skilled in the art.

While the present invention has been described with particular reference to a color television system, it will be appreciated that it may be applied to any equipment in which it is desired to give a precise varied color indication in a cathode ray tube. Colored radar is an example of another application of the invention.

There is provided by the present invention a multi-layer colored image producing luminescent screen which is characterized by a faithful reproduction of colors at relatively low electron beam potentials. The screen is further characterized by enhanced resolution and contrast as compared to settled and other gross or multi-particle thick layer screens, as well as mono-particle layer screens. The colors produced are purer and sharper as relates to separation of one color from another. There is provided also a cathode ray tube and a television system for utilizing such a screen.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A cathode ray tube screen for producing colored images comprising a plurality of superimposed, contiguous, transparent, continuous and homogeneous films consisting of luminescent phosphor of uniform thickness throughout, each of said films being capable of producing a different color in situ under excitation by a variable energy electron beam of 15 kilovolts maximum energy.

2. A cathode ray tube screen for producing colored images comprising three superimposed, contiguous, transparent, continuous, and homogeneous films consisting of luminescent phosphor of uniformity thickness throughout, each of said films being capable of producing a different color under cathode ray excitation, two of said films having a thickness of less than 0.5 micron to allow color images to be excited by a variable-energy electron beam of 15 kilovolts maximum energy.

3. A cathode ray tube screen for producing colored images comprising a plurality of transparent, continuous and homogeneous films consisting of luminescent phosphor of uniform thickness throughout each of said films being capable of producing a different color under cathode ray excitation, said phosphor films being successively formed one upon another by a vapor-chemical reaction to form a composite screeen which emits high purity color images when excited by a variable-energy electron beam of 15 kilovolts maximum energy.

4. In a cathode ray tube for producing colored images, a luminescent screen comprising a light transmitting base plate, a plurality of transparent, continuous and homogeneous phosphor films of uniform thickness throughout each of said films being capable of producing a different color under cathode ray excitation deposited successively and contiguously upon said base plate, and a thin conducting film deposited upon the last deposited of said phosphor films, said screen being operative to produce high purity images when excited by a variable-energy electron beam of 15 kilovolts maximum energy.

5. The luminescent screen of claim 4 wherein there are three phosphors, the last two deposited of which are approximately 0.4 and 0.2 micron thick, respectively.

6. In a cathode ray tube for producing colored images, a luminescent screen comprising a light transmitting base plate, a first transparent, continuous and homogeneous color emitting phosphor layer of uniform thickness throughout chemically deposited upon said base plate, a second transparent, continuous and homogeneous color emitting phosphor layer of uniform thickness of approximately 0.4 micron throughout chemically deposited upon said first deposited layer, a third continuous and homogeneous color emitting phosphor layer of uniform thickness of approximately 0.2 micron throughout chemically deposited upon said second layer, each of said phosphor layers being capable of producing a different color under cathode ray excitation, and a conducting film deposited upon said third phosphor layer.

7. In a cathode ray tube for producing colored images, a luminescent screen comprising light transmitting base plate, a first transparent, continuous and homogeneous color emitting phosphor layer of uniform thickness throughout deposited upon said base plate, a second transparent, continuous and homogeneous color emitting phosphor layer of uniform thickness of approximately 0.4 micron throughout chemically deposited upon said first deposited layer, a third continuous and homogeneous color emitting phosphor layer of uniform thickness of approximately 0.2 micron throughout chemically deposited upon said second layer, each of said phosphor layers being capable of producing a different color, in situ under excitation of a variable energy electron beam having maximum energy of 15 kilovolts.

8. The luminescent screen of claim 7 wherein said phosphors are selected from the group consisting of zinc sulfide, zinc selenide, cadmium sulfide, cadmium selenide, and mixtures thereof.

References Cited in the file of this patent
UNITED STATES PATENTS

| | | |
|---|---|---|
| 2,566,713 | Zworykin | Sept. 4, 1951 |
| 2,580,073 | Burton | Dec. 25, 1951 |
| 2,590,018 | Koller et al. | Mar. 18, 1952 |
| 2,675,331 | Cusano et al. | Apr. 13, 1954 |